(12) United States Patent
Buck et al.

(10) Patent No.: US 8,819,040 B2
(45) Date of Patent: Aug. 26, 2014

(54) METHOD AND SYSTEM FOR QUERYING A DATABASE

(75) Inventors: Schuyler Buck, Muncie, IN (US); Morris J. Young, Indianapolis, IN (US); Jason Bush, Fishers, IN (US); Scott W. Leahy, Fort Wayne, IN (US); Ryan Scott McKinney, Jamestown, IN (US)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1745 days.

(21) Appl. No.: 11/999,912

(22) Filed: Dec. 7, 2007

(65) Prior Publication Data

US 2009/0150351 A1 Jun. 11, 2009

(51) Int. Cl.
*G06F 17/30* (2006.01)

(52) U.S. Cl.
USPC .......................................... 707/758

(58) Field of Classification Search
CPC .................................. G06F 17/30398
USPC .................................. 707/999.003
See application file for complete search history.

(56) References Cited

U.S. PATENT DOCUMENTS

| | | | |
|---|---|---|---|
| 5,251,126 A | 10/1993 | Kahn et al. | |
| 5,497,486 A | 3/1996 | Stolfo et al. | |
| 5,671,404 A | 9/1997 | Lizee et al. | |
| 5,671,409 A | 9/1997 | Fatseas et al. | |
| 5,950,190 A * | 9/1999 | Yeager et al. ..................... | 1/1 |
| 5,951,300 A | 9/1999 | Brown | |
| 5,995,962 A | 11/1999 | Horowitz | |
| 6,024,699 A | 2/2000 | Surwit et al. | |
| 6,032,119 A | 2/2000 | Brown et al. | |
| 6,322,502 B1 | 11/2001 | Schoenberg et al. | |
| 6,425,863 B1 | 7/2002 | Werner et al. | |
| 6,562,001 B2 | 5/2003 | Lebel et al. | |
| 6,564,105 B2 | 5/2003 | Starkweather et al. | |
| 6,571,128 B2 | 5/2003 | Lebel et al. | |
| 6,577,899 B2 | 6/2003 | Lebel et al. | |
| 6,585,644 B2 | 7/2003 | Lebel et al. | |
| 6,605,038 B1 | 8/2003 | Teller et al. | |
| 6,635,014 B2 | 10/2003 | Starkweather et al. | |
| 6,648,821 B2 | 11/2003 | Lebel et al. | |
| 6,658,404 B1 * | 12/2003 | Cecchini ........................ | 707/758 |

(Continued)

FOREIGN PATENT DOCUMENTS

| | | |
|---|---|---|
| DE | 20217855 | 2/2003 |
| EP | 0970655 | 1/2000 |

(Continued)

OTHER PUBLICATIONS

Lawrence et al. Drag-and-drop multimedia: an interface framework for digital libraries, published 1999 International Journal on Digital Libraries.*

(Continued)

*Primary Examiner* — Kevin L Young
(74) *Attorney, Agent, or Firm* — Roche Diagnostics Operations, Inc.

(57) ABSTRACT

A method and system for querying a database involves dragging and dropping selected search criteria from one portion of a display to another portion of a display. When searching multiple criteria, a Boolean operation associated with the method depends upon the respective positions of the search criteria in the display. The method also allows for the results of the search to be dynamically updated as different criteria are selected.

20 Claims, 17 Drawing Sheets

(56) References Cited

U.S. PATENT DOCUMENTS

| | | | |
|---|---|---|---|
| 6,659,948 B2 | 12/2003 | Lebel et al. | |
| 6,668,196 B1 | 12/2003 | Villegas et al. | |
| 6,684,191 B1 | 1/2004 | Barnard et al. | |
| 6,687,546 B2 | 2/2004 | Lebel et al. | |
| 6,694,191 B2 | 2/2004 | Starkweather et al. | |
| 6,733,446 B2 | 5/2004 | Lebel et al. | |
| 6,740,075 B2 | 5/2004 | Lebel et al. | |
| 6,748,402 B1 | 6/2004 | Reeves | |
| 6,758,810 B2 | 7/2004 | Lebel et al. | |
| 6,781,522 B2 | 8/2004 | Sleva et al. | |
| 6,785,668 B1* | 8/2004 | Polo et al. | 707/771 |
| 6,804,656 B1 | 10/2004 | Rosenfeld et al. | |
| 6,810,290 B2 | 10/2004 | Lebel et al. | |
| 6,811,533 B2 | 11/2004 | Lebel et al. | |
| 6,811,534 B2 | 11/2004 | Bowman, IV et al. | |
| 6,813,519 B2 | 11/2004 | Lebel et al. | |
| 6,852,104 B2 | 2/2005 | Blomquist | |
| 6,873,268 B2 | 3/2005 | Lebel et al. | |
| 6,873,807 B2 | 3/2005 | Umetsu | |
| 6,958,705 B2 | 10/2005 | Lebel et al. | |
| 6,990,434 B2 | 1/2006 | Minogue et al. | |
| 7,020,508 B2 | 3/2006 | Stivoric et al. | |
| 7,024,236 B2 | 4/2006 | Ford et al. | |
| 7,029,455 B2 | 4/2006 | Flaherty | |
| 7,041,468 B2 | 5/2006 | Drucker et al. | |
| 7,050,735 B2 | 5/2006 | Bardolatzy et al. | |
| 7,063,665 B2 | 6/2006 | Hasegawa et al. | |
| 7,082,334 B2 | 7/2006 | Boute et al. | |
| 7,113,946 B2 | 9/2006 | Cosic | |
| 7,120,488 B2 | 10/2006 | Nova et al. | |
| 7,165,062 B2 | 1/2007 | O'Rourke | |
| 7,179,226 B2 | 2/2007 | Crothall et al. | |
| 7,181,350 B2 | 2/2007 | Oberding et al. | |
| 7,207,009 B1 | 4/2007 | Aamodt et al. | |
| 7,418,600 B2* | 8/2008 | Dettinger et al. | 713/193 |
| 8,073,868 B2* | 12/2011 | Lavi | 707/779 |
| 2002/0016568 A1 | 2/2002 | Lebel et al. | |
| 2002/0029776 A1 | 3/2002 | Blomquist | |
| 2002/0040208 A1 | 4/2002 | Flaherty et al. | |
| 2002/0059299 A1 | 5/2002 | Spaey | |
| 2002/0099701 A1* | 7/2002 | Rippich | 707/5 |
| 2002/0140976 A1 | 10/2002 | Borg et al. | |
| 2002/0169759 A1 | 11/2002 | Kraft et al. | |
| 2002/0193679 A1 | 12/2002 | Malave et al. | |
| 2003/0002848 A1 | 1/2003 | Kawaoka et al. | |
| 2003/0011646 A1 | 1/2003 | Levine et al. | |
| 2003/0018644 A1* | 1/2003 | Bala et al. | 707/100 |
| 2003/0065308 A1 | 4/2003 | Lebel et al. | |
| 2003/0065536 A1 | 4/2003 | Hansen et al. | |
| 2003/0069758 A1 | 4/2003 | Anderson et al. | |
| 2003/0098869 A1 | 5/2003 | Arnold et al. | |
| 2003/0140044 A1 | 7/2003 | Mok et al. | |
| 2003/0145206 A1 | 7/2003 | Wolosewicz et al. | |
| 2003/0163088 A1 | 8/2003 | Blomquist | |
| 2003/0163455 A1 | 8/2003 | Dettinger et al. | |
| 2003/0199739 A1 | 10/2003 | Gordon et al. | |
| 2003/0208465 A1* | 11/2003 | Yurko et al. | 707/1 |
| 2004/0030987 A1 | 2/2004 | Manelli | |
| 2004/0038389 A1 | 2/2004 | Maus et al. | |
| 2004/0073464 A1 | 4/2004 | Huang | |
| 2004/0086314 A1 | 5/2004 | Chen et al. | |
| 2004/0111296 A1 | 6/2004 | Rosenfeld et al. | |
| 2004/0119742 A1 | 6/2004 | Silbey et al. | |
| 2004/0172284 A1 | 9/2004 | Sullivan et al. | |
| 2005/0004911 A1* | 1/2005 | Goldberg et al. | 707/7 |
| 2005/0004947 A1 | 1/2005 | Emlet et al. | |
| 2005/0010452 A1 | 1/2005 | Lusen | |
| 2005/0137653 A1 | 6/2005 | Friedman et al. | |
| 2005/0159977 A1 | 7/2005 | Green et al. | |
| 2005/0182655 A1 | 8/2005 | Merzlak et al. | |
| 2005/0187794 A1 | 8/2005 | Kimak | |
| 2005/0192844 A1 | 9/2005 | Esler et al. | |
| 2005/0259945 A1 | 11/2005 | Splaver | |
| 2006/0010014 A1 | 1/2006 | Brown | |
| 2006/0010098 A1* | 1/2006 | Goodnow et al. | 707/1 |
| 2006/0020491 A1 | 1/2006 | Mongeon et al. | |
| 2006/0031094 A1 | 2/2006 | Cohen et al. | |
| 2006/0095298 A1 | 5/2006 | Bina | |
| 2006/0155581 A1 | 7/2006 | Eisenberger et al. | |
| 2006/0161460 A1 | 7/2006 | Smitherman et al. | |
| 2006/0167367 A1 | 7/2006 | Stanczak et al. | |
| 2006/0178910 A1 | 8/2006 | Eisenberger et al. | |
| 2006/0184524 A1 | 8/2006 | Pollanz | |
| 2006/0224638 A1 | 10/2006 | Wald et al. | |
| 2006/0272652 A1 | 12/2006 | Stocker et al. | |
| 2007/0033074 A1 | 2/2007 | Nitzan et al. | |
| 2007/0048691 A1 | 3/2007 | Brown | |
| 2007/0055940 A1 | 3/2007 | Moore et al. | |
| 2007/0088525 A1 | 4/2007 | Fotiades et al. | |
| 2007/0089071 A1 | 4/2007 | Zinn et al. | |
| 2007/0179352 A1 | 8/2007 | Randlov et al. | |
| 2007/0179975 A1 | 8/2007 | Teh et al. | |
| 2007/0185390 A1 | 8/2007 | Perkins et al. | |
| 2007/0189590 A1 | 8/2007 | Fidrich et al. | |
| 2007/0219432 A1 | 9/2007 | Thompson | |
| 2007/0232866 A1 | 10/2007 | Nephin et al. | |
| 2007/0276197 A1 | 11/2007 | Harmon | |
| 2008/0082501 A1* | 4/2008 | Hardy | 707/3 |

FOREIGN PATENT DOCUMENTS

| | | |
|---|---|---|
| EP | 0649316 | 12/2000 |
| EP | 1194864 | 4/2002 |
| EP | 1416417 | 5/2004 |
| EP | 1647929 | 4/2006 |
| EP | 1662417 | 5/2006 |
| JP | 04/145774 | 5/2004 |
| JP | 04/145775 | 5/2004 |
| JP | 04/145776 | 5/2004 |
| JP | 07/058685 | 3/2007 |
| WO | WO9609590 | 3/1996 |
| WO | WO0018449 | 4/2000 |
| WO | WO0065522 | 11/2000 |
| WO | WO0072181 | 11/2000 |
| WO | WO0174229 | 10/2001 |
| WO | WO0200111 | 1/2002 |
| WO | WO02078512 | 10/2002 |
| WO | WO03015838 | 2/2003 |
| WO | WO2005037095 | 4/2005 |
| WO | WO2005096206 | 10/2005 |
| WO | WO2006050485 | 5/2006 |
| WO | WO2007005530 | 1/2007 |
| WO | WO2007084502 | 7/2007 |
| WO | WO2007093482 | 8/2007 |

OTHER PUBLICATIONS

Wang, C. et al.; "*A CORBA-Based Object Framework with Patient Identification Translation and Dynamic Linking, Methods for Exchanging Patient Data*," Methods of Information in Medicine, Mar. 1999, pp. 56-65, vol. 38, No. 1, F.K.Schattauer Verlagsgesellschaft mbH, Germany.

Bilenko, M. et al.; "*Adaptive Name Matching in Information Integration*," IEEE Intelligent Systems; Sep. 2003, vol. 18, No. 5; p. 16-23, IEEE Computer Society.

Frenger, Paul; "*GRANNIE 2: a Ubiquitious, Protean Robotic Guardian Angel*," Automation Science and Engineering, Sep. 1, 2007, pp. 857-862, IEEE International Conference on IEEE.

Frenger, Paul; "*GRANNIE: A Scalable, Interactive, Artificial Intelligence Supervisory System for Medical Devices*," Proceedings of Can. Med. Bio. Engr. Conference, 2007, p. 256-259.

"CoPilot Health Management System Version 3.1," User's Guide, Mar. 2007, 230 pp., ART 10641 Rev. D, Abbott Diabetes Care, Inc.

"MediSense® Precision Link® Diabetes Data Management Software," User's Guide, May 2006, 58 pp., 116-412 Rev. AC, Abbott Diabetes Care, Inc.

Albisser, Michael A.; "A Graphical User Interface for Diabetes Management Than Integrates Glucose Prediction and Decision Support," Diabetes Technology & Therapeutics, 2005, pp. 264-273, vol. 7, No. 2.

(56) References Cited

OTHER PUBLICATIONS

Janssen et al., "Acensia® Winglucofacts® Professional Intelligent Diabetes Management Software is an Effective Tool for the Management of Diabetes," Bayer HealthCare Clinical Summary Report, Jul. 2005, 10 pp.

Joshy et al.; "Diabetes Information Systems: A Rapidly Emerging Support for Diabetes Surveillance and Care," Diabetes Technology & Therapeutics, 2006, pp. 587-597, vol. 8, No. 5.

"OneTouch Diabetes Management Software," User Manual, 2006, 173 pp., v. 2.3.1, Lifescan, Inc.

"Getting Started, CareLink Personal Therapy Management Software for Diabetes," Brochure, 2007, 20 pp., Medtronic Minimed, Inc.

"Accu-Chek® Camit Pro Diabetes Management Software," User's Manual, 2005, 220 pp., v.2.1 and Addendum v. 2.4, Roche Diagnostics Corp.

"Accu-Chek® Compass Diabetes Care Software," User's Guide, 2005, 74 pp., Roche Diagnostics Corp.

"Accu-Chek® Diabetes Assistant," accessed with notional data and printed from www.diabetesassistant.com on Jan. 16, 2007, 20 pp., Roche Diagnostics Corp.

* cited by examiner

FIG. 15

METHOD AND SYSTEM FOR QUERYING A DATABASE

FIELD OF THE INVENTION

The present invention relates to the field medical devices. Specifically, the present invention relates to medical software capable of querying a database.

BACKGROUND OF THE INVENTION

Software for monitoring medical information for a patient is known. For example, prior art software is capable of compiling blood glucose and other similar measurements for a patient with diabetes. The data gathered for each patient, in addition to the vital statistics associated with the patient, such as name, age, gender, etc., may be stored in a database. A user, such as a medical professional caring for multiple patients, may need to query the database in order to locate a patient or groups of patients satisfying specific criteria of interest to the medical professional.

SUMMARY OF THE INVENTION

An embodiment of the invention includes a method of constructing a search to query a database including a plurality of records. The method comprises the steps of listing at least one type of search criteria in a first portion of a display; selecting at least one of the search criteria and listing it in a second portion of the display; and locating the records satisfying the search criteria displayed in the second portion.

The method may further comprise the step of listing a second type of search criteria in the second portion of the display. The position of the second type of search criteria with respect to the position of the first type of search criteria determines the type of Boolean operation connecting the search criteria. The method may further include the step of indicating the type of Boolean operation as the second type of search criteria is positioned. The indication may occur in the second portion of the display, and a line may indicate the type of Boolean operation. In embodiments of the invention, the size of the line indicates the type of Boolean operation, and in embodiments of the invention, the color of the line indicates the type of Boolean operation.

In embodiments of the invention, the method further comprises the step of displaying the number of records satisfying the search criteria in a display box. In embodiments of the invention, the placing step is accomplished by dragging the search criteria from the first portion of the display and dropping the search criteria in the second portion of the display. In addition, the type of search criteria may include at least one drop down menu.

Embodiments of the invention include a method for constructing a search of a database including a plurality of data records. The method may comprise the steps of listing a set of possible search criteria in a first portion of a display; and selecting at least one search criteria from the first portion of the display; and moving the selected search criteria to a second portion of the display.

Embodiments of the invention include a method of constructing a search of a database including a plurality of recordings. The method comprises the steps of listing a plurality of search criteria on a first portion of a display; dragging and dropping a first search criteria onto a second portion of the display; dragging and dropping a second search criteria onto the second portion of the display; and comparing the records to the search criteria on the second portion of the display.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein:

FIGS. 1 through 17 depict screen captures of a program embodying aspects of the present invention.

Figure 1:
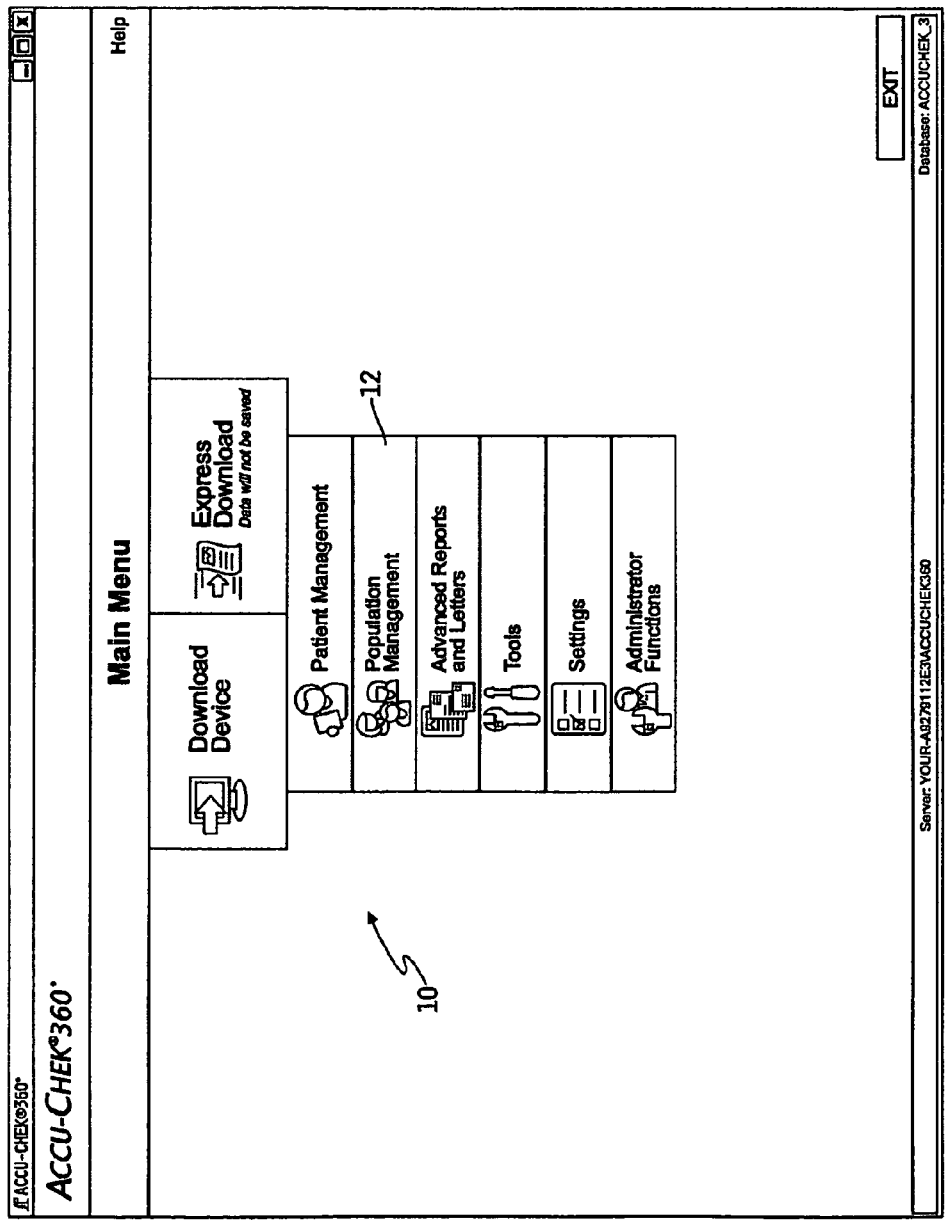

Although the drawings represent embodiments of various features and components according to the present invention, the drawings are not necessarily to scale and certain features may be exaggerated in order to better illustrate and explain the present invention. The exemplification set out herein illustrates certain embodiments of the invention, and such exemplification is not to be construed as limiting the scope of the invention in any manner.

DETAILED DESCRIPTION OF EMBODIMENTS OF THE INVENTION

For the purposes of promoting an understanding of the principles of the invention, reference will now be made to the embodiments illustrated in the drawings, which are described below. It will nevertheless be understood that no limitation of the scope of the invention is thereby intended. The invention includes any alterations and further modifications in the illustrated device and described method and further applications of the principles of the invention, which would normally occur to one skilled in the art to which the invention relates. Moreover, the embodiment was selected for description to enable one of ordinary skill in the art to practice the invention.

Concepts described below may be further explained in one of more of the co-filed patent applications entitled HELP UTILITY FUNCTIONALITY AND ARCHITECTURE Ser. No. 11/999,906, METHOD AND SYSTEM FOR GRAPHICALLY INDICATING MULTIPLE DATA VALUES Ser. No. 11/999,853, SYSTEM AND METHOD FOR DATABASE INTEGRITY CHECKING Ser. No. 11/999,856, METHOD AND SYSTEM FOR DATA SOURCE AND MODIFICATION TRACKING Ser. No. 11/999,888, PATIENT-CENTRIC HEALTHCARE INFORMATION MAINTENANCE Ser. No. 11/999,874 EXPORT FILE FORMAT WITH MANIFEST FOR ENHANCED DATA TRANSFER Ser. No. 11/999,867, GRAPHIC ZOOM FUNCTIONALITY FOR A CUSTOM REPORT Ser. No. 11/999,932, METHOD AND SYSTEM FOR SELECTIVE MERGING OF PATIENT DATA Ser. No. 11/999,859, METHOD AND SYSTEM FOR PERSONAL MEDICAL DATA DATABASE MERGING Ser. No. 11/999,772, METHOD AND SYSTEM FOR WIRELESS DEVICE COMMUNICATION Ser. No. 11/999,879, METHOD AND SYSTEM FOR SETTING TIME BLOCKS Ser. No. 11/999,968, METHOD AND SYSTEM FOR ENHANCED DATA TRANSFER Ser. No. 11/999,911, COMMON EXTENSIBLE DATA EXCHANGE FORMAT Ser. No. 11/999,871, METHOD OF CLONING SERVER INSTALLATION TO A NETWORK CLIENT Ser. No. 11/999,876, METHOD AND SYSTEM FOR EVENT BASED DATA COMPARISON Ser. No. 11/999,921, DYNAMIC COMMUNICATION STACK Ser. No. 11/999,934, SYSTEM AND METHOD FOR REPORTING MEDICAL INFORMATION Ser. No. 11/999, 878, METHOD AND SYSTEM FOR MERGING EXTENSIBLE DATA INTO A DATABASE USING GLOBALLY UNIQUE IDENTIFIERS Ser. No. 11/999,947, METHOD AND SYSTEM FOR ACTIVATING FEATURES AND FUNCTIONS OF A CONSOLIDATED SOFTWARE APPLICATION Ser. No. 11/999,880, METHOD AND SYSTEM FOR CONFIGURING A CONSOLIDATED SOFTWARE APPLICATION Ser. No. 11/999,894, METHOD AND SYSTEM FOR DATA SELECTION AND DISPLAY Ser. No. 11/999,896, METHOD AND SYSTEM FOR ASSOCIATING DATABASE CONTENT FOR SECURITY ENHANCEMENT Ser. No. 11/999,951, METHOD AND SYSTEM FOR CREATING REPORTS Ser. No. 11/999,851, METHOD AND SYSTEM FOR CREATING USER-DEFINED OUTPUTS Ser. No. 11/999,905, DATA DRIVEN COMMUNICATION PROTOCOL GRAMMAR Ser. No. 11/999,770, HEALTHCARE MANAGEMENT SYSTEM HAVING IMPROVED PRINTING OF DISPLAY SCREEN INFORMATION Ser. No. 11/999,855, and METHOD AND SYSTEM FOR MULTI-DEVICE COMMUNICATION Ser. No. 11/999,866, the entire disclosures of which are hereby expressly incorporated herein by reference. It should be understood that the concepts described below may relate to diabetes management software systems for tracking and analyzing health data, such as, for example, the ACCU-CHEK® 360° product provided by Roche Diagnostics. However, the concepts descibed herein may also have applicability to apparatuses, methods, systems, and software in fields that are unrelated to healthcare. Furthermore, it should be understood that references in this patent application to devices, meters, monitors, pumps, or related terms are intended to encompass any currently existing or later developed apparatus that includes some or all of the features attributed to the referred to apparatus, including but not limited to the ACCU-CHEK® Active, ACCU-CHEK® Aviva, ACCU-CHEK® Compact, ACCU-CHEK® Compact Plus, ACCU-CHEK® Integra, ACCU-CHEK® Go, ACCU-CHEK® Performa, ACCU-CHEK® Spirit, ACCU-CHEK® D-Tron Plus, and ACCU-CHEK® Voicemate Plus, all provided by Roche Diagnostics or divisions thereof.

FIG. 1 depicts a screen capture from software entitled ACCU-CHEK® 360° from Roche Diagnostics, representing an embodiment of the present invention. The ACCU-CHEK® 360° software may be utilized on any suitable processor, such as a computer, cell phone, personal data assistant, etc. The present embodiment of the invention relates to medical software utilized in the care of a patient with diabetes. It should be noted that the invention itself is not limited to medical software, but may be utilized in any suitable software program.

The present software is configured for use with a database containing information on a plurality of patients. Generally, for each patient, the database includes personal information such as the patient's name, birth date, gender, etc., along with medical information such as the type of diabetes that the patient has, blood glucose measurements associated with the patient over time, the type of insulin utilized by the patient, etc. Furthermore, the information for each patient may be linked to the other stored information for a given patient in any suitable manner.

With reference still to FIG. 1, numeral 10 generally indicates a main menu. Main menu 10 includes a plurality of menu options, including a population management icon 12. In the present example, population management allows a user to structure a search in order to locate patients within the database that satisfy a specific search criteria. The patients meeting the search criteria may be saved as a group for later reference. Population management icon 12 may be selected in any suitable manner, such as by utilizing a mouse to control a cursor in order to click the population management icon 12.

Figure 2:
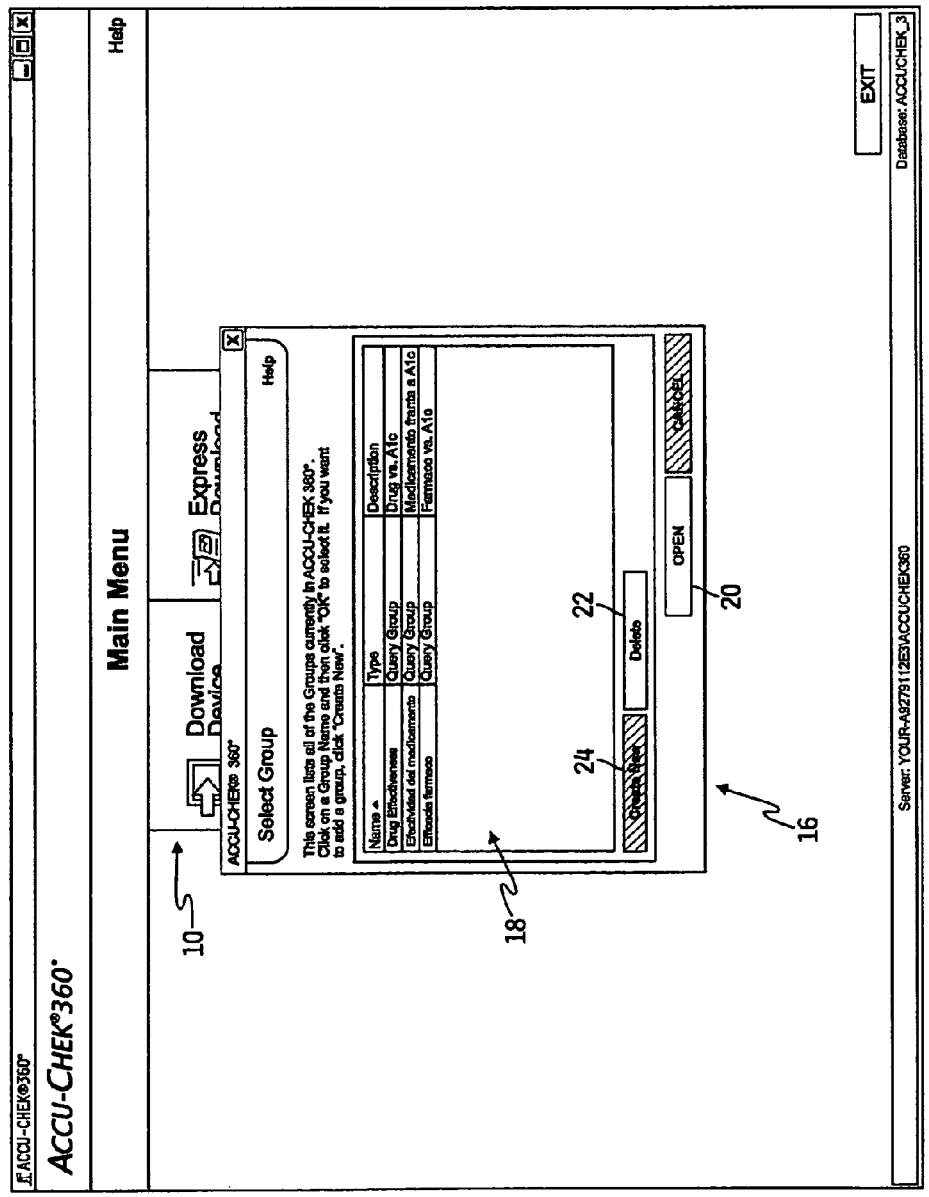

As shown in FIG. 2, clicking the population management icon 12 causes an interface box, indicated by numeral 16, to open. Interface box 16 may include a listing of groups, generally indicated by numeral 18, an open icon 20, a delete icon 22 and create new icon 24. The group listing 18 displays all groups previously created by the user. If the user desires to open one of the previous group listings 18, the user may do so in any conventional manner. For example, the user may double click the group that the user desires to open, or the user may click the group that the user would like to open to highlight it and then click the open icon 20. The user may also delete a group by selecting the group and then actuating the delete icon 22.

Figure 3:
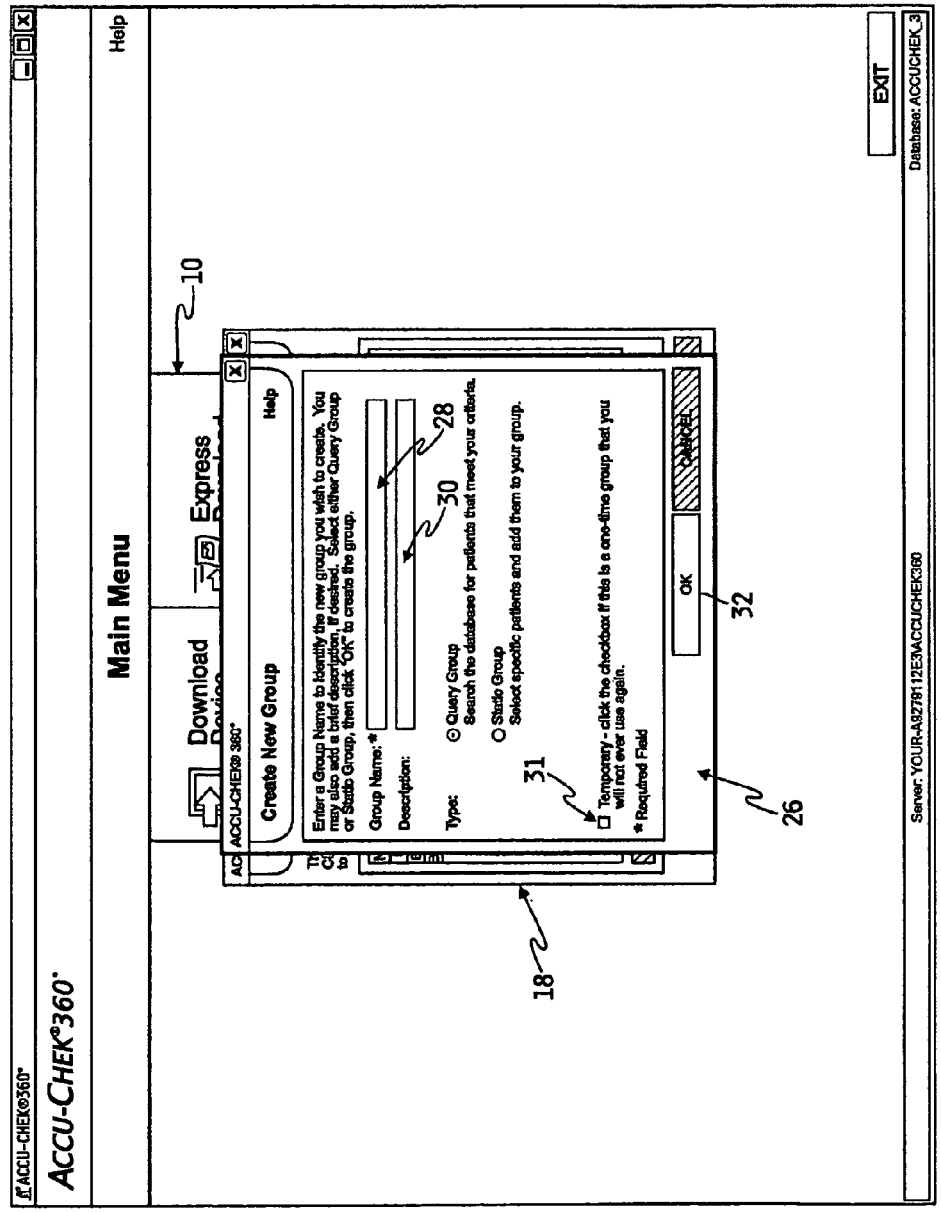

Referring still to FIG. 2, if the user would like to create a custom group, the user may click the create new icon 24. As shown in FIG. 3, once the user clicks the create new icon 24, a create new group interface box, indicated by numeral 26, is displayed. In interface box 26, numeral 28 indicates a box in which the user may enter a group name, and numeral 30 indicates a box in which the user may enter a description of the group. Once the user has entered a group name in box 28 and a description in box 30, the user may actuate the OK icon 32 in a suitable manner, such as by clicking, for example.

Interface box 26 further includes a toggle 31. Toggle 31 allows a user to create a session-persistent ad-hoc group that is not stored in the memory of the computer once the session ends. Instead, the group is deleted from the memory of the computer upon the ending of a session. Accordingly, a user may click the toggle 31, in the event that the user would like to find patients satisfying search criteria on a one time basis, or in the event the user does not desire to store the results in memory.

Figure 4:
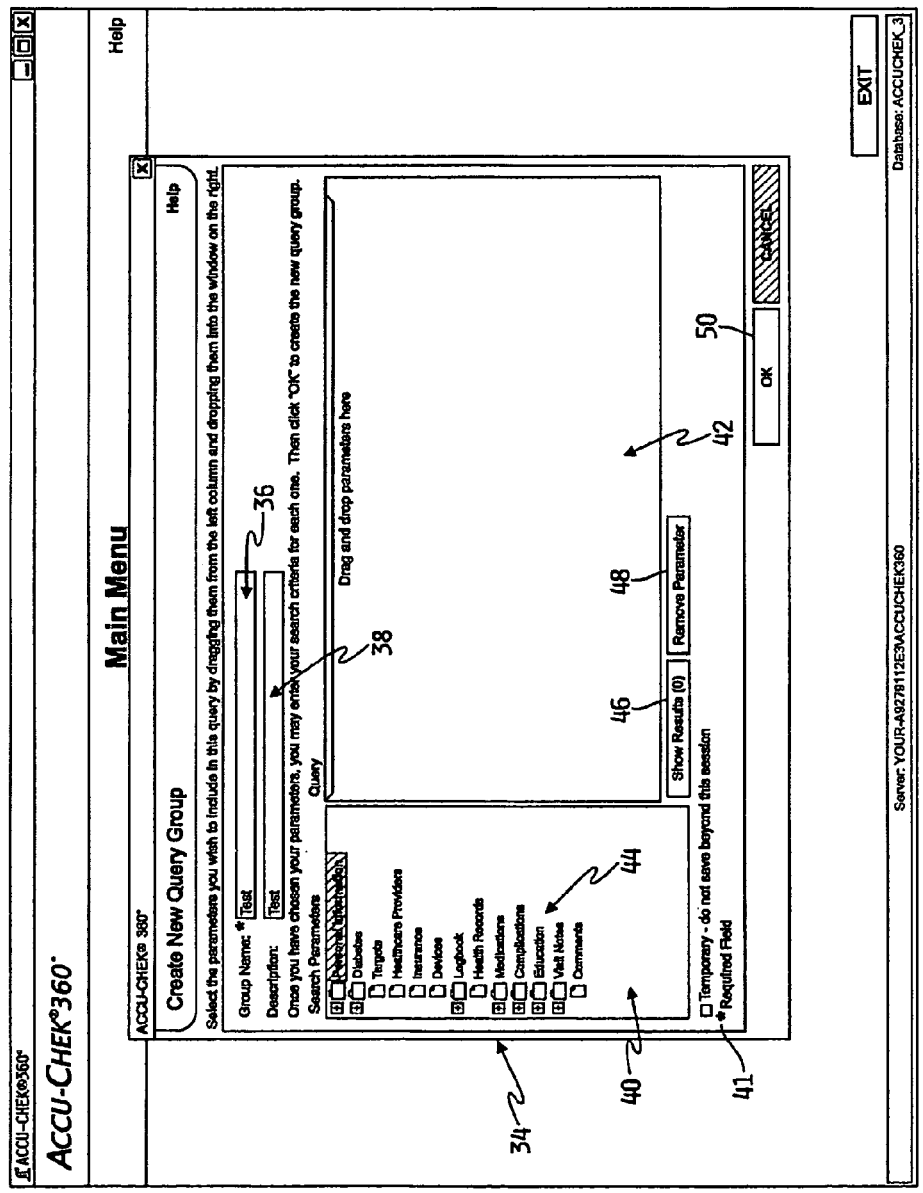

Upon actuating the OK icon 32, the software presents the user with a create new query group interface box 34, as shown in FIG. 4. In the present embodiment, box 34 includes a box 36 displaying the group name, a box 38 displaying the group description, a search parameter menu, indicated by numeral 40, and a query box, indicated by numeral 42.

In the depicted embodiment, search parameter menu 40 includes a list of search parameters, generally indicated by numeral 44. The list of search parameters 44 may include any desired data information that may be associated with the patients. For example, the search parameters may include personal information, such as name, birth date, age, gender, etc. and diabetes information, such as diabetes type, diagnosis date, insulin start date, etc. along with various other type of information.

Referring still to FIG. 4, in the depicted embodiment, group interface box 34 further includes a show results icon 46 and a remove parameter icon 48. In addition, the group interface box 34 further includes an OK icon 50.

With reference still to FIG. 4, the user may elect to search any of the criteria comprising list 44. For example, the user may select the age of the patients as the search criteria.

It should be noted with reference to FIG. 4, that toggle 41 allows a user to create the group as a session persistent ad-hoc group that will be deleted from memory, once the session ends, in a manner similar to that described above with respect to toggle 31 in FIG. 3.

Figure 5:
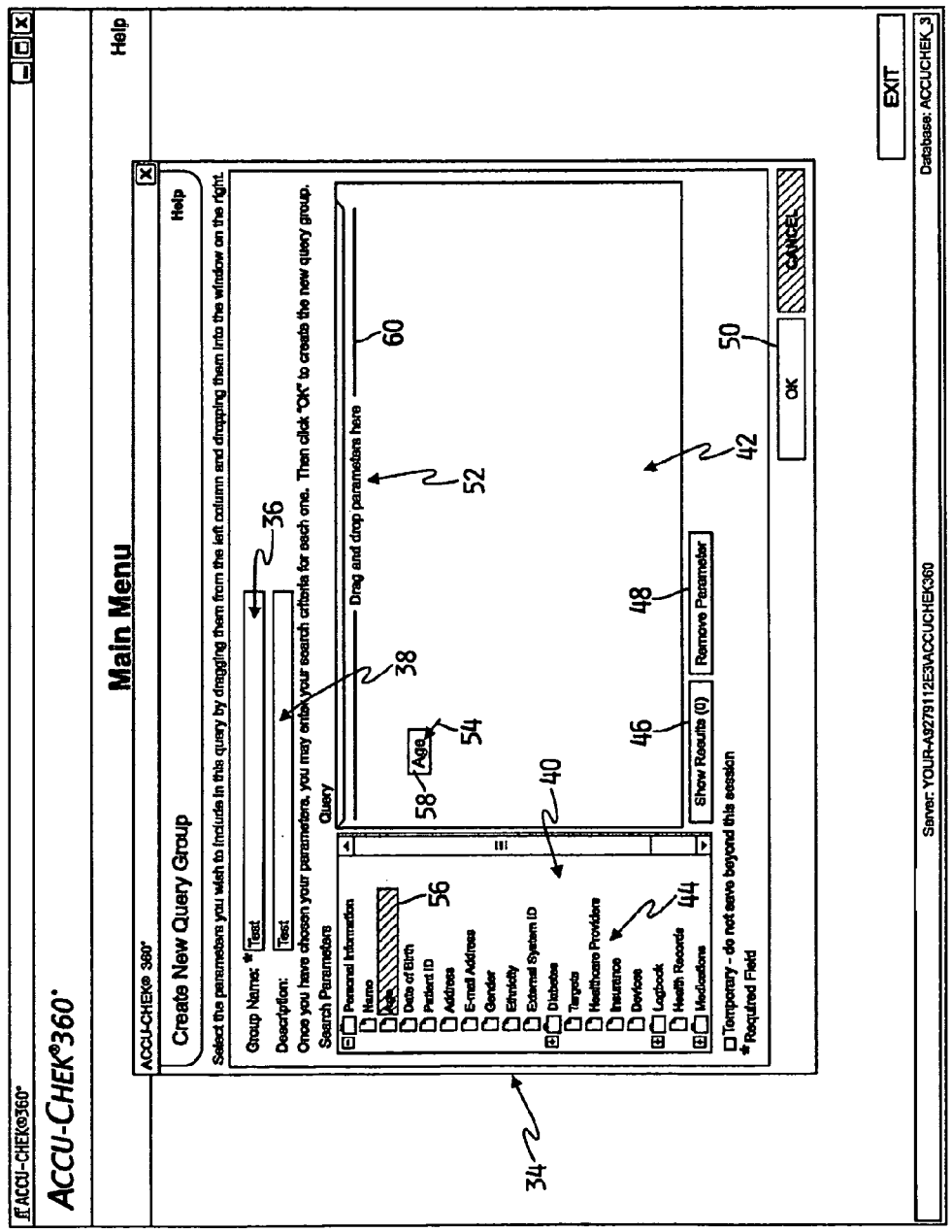

With reference now to FIG. 5, in the present embodiment, in order to construct the search, the user may move the cursor 54 to the age parameter 56 of the list of search parameters 44. The user may then click the age parameter 56 and begin dragging the age parameter 56. Once the cursor 54 crosses from the search parameter menu 40 into the query box 42, an icon 58 that includes text, indicating the type of file being dragged, appears. For example, in the depicted embodiment, icon 58 includes text reading "Age," since the age parameter 56 has been selected and dragged by the user into the query box 42. In addition, once the icon 58 appears in the query box 42, an indicator line 60 also appears. It should be noted that in the depicted embodiment, indicator line 60 extends across substantially the entire width of query box 42. In addition, indicator line 60 may be a given color, such as blue, for example.

Figure 6:
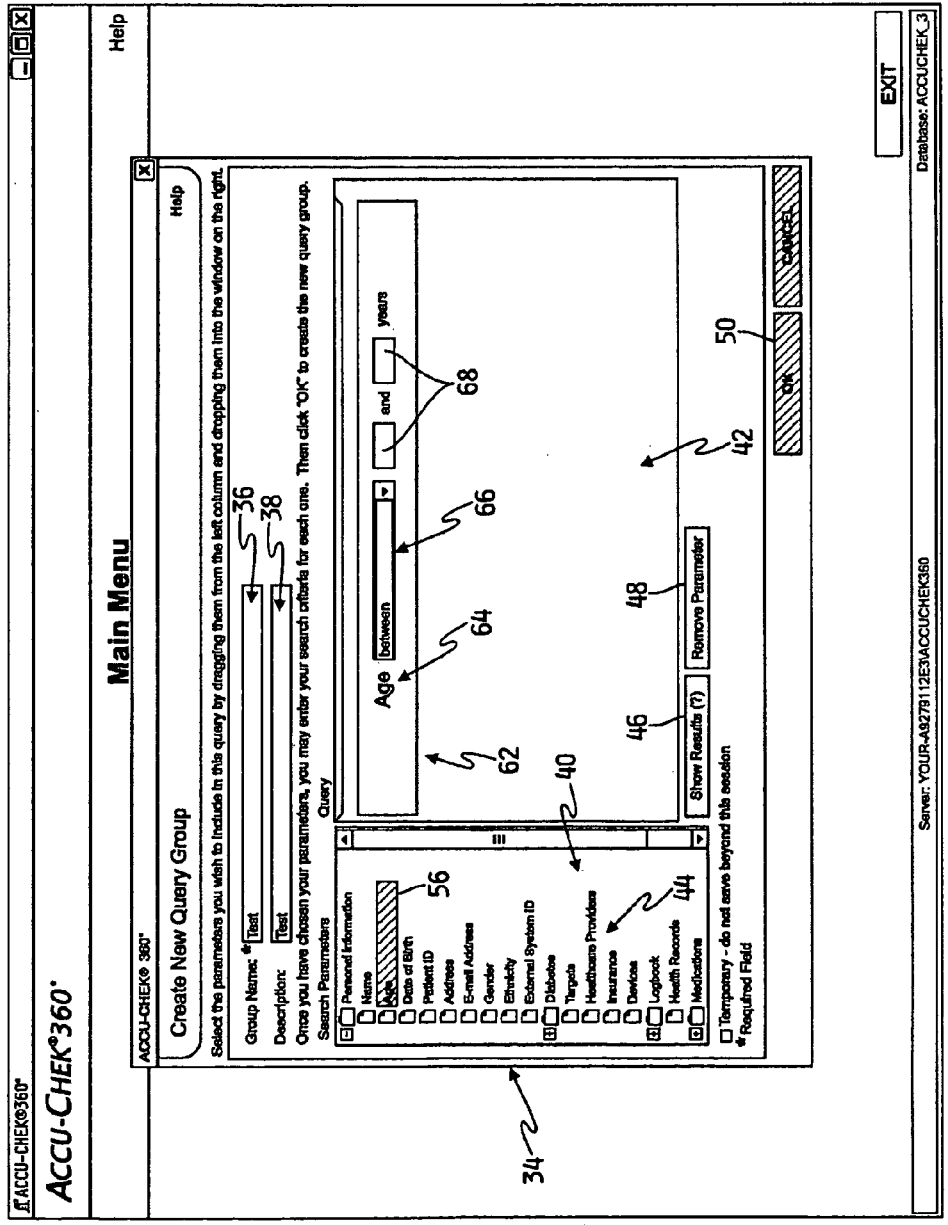

As shown in FIG. 6, once the user drops, or releases the icon 58 in query box 42, a first search box, indicated by numeral 62, appears. First search box 62 includes a title 64 indicating the search parameter to be searched. In the present example, the title 64 reads "Age," since the user dragged the age search criteria from the search parameters menu 40.

As shown in FIG. 6, the search box 62 includes a drop down menu 66 and two information entering boxes, each indicated by numeral 68. As can be seen from FIG. 6, search box 62 defaults into allowing a user to search for patients having an age that falls within the range specified in the information boxes 68.

Figure 7:
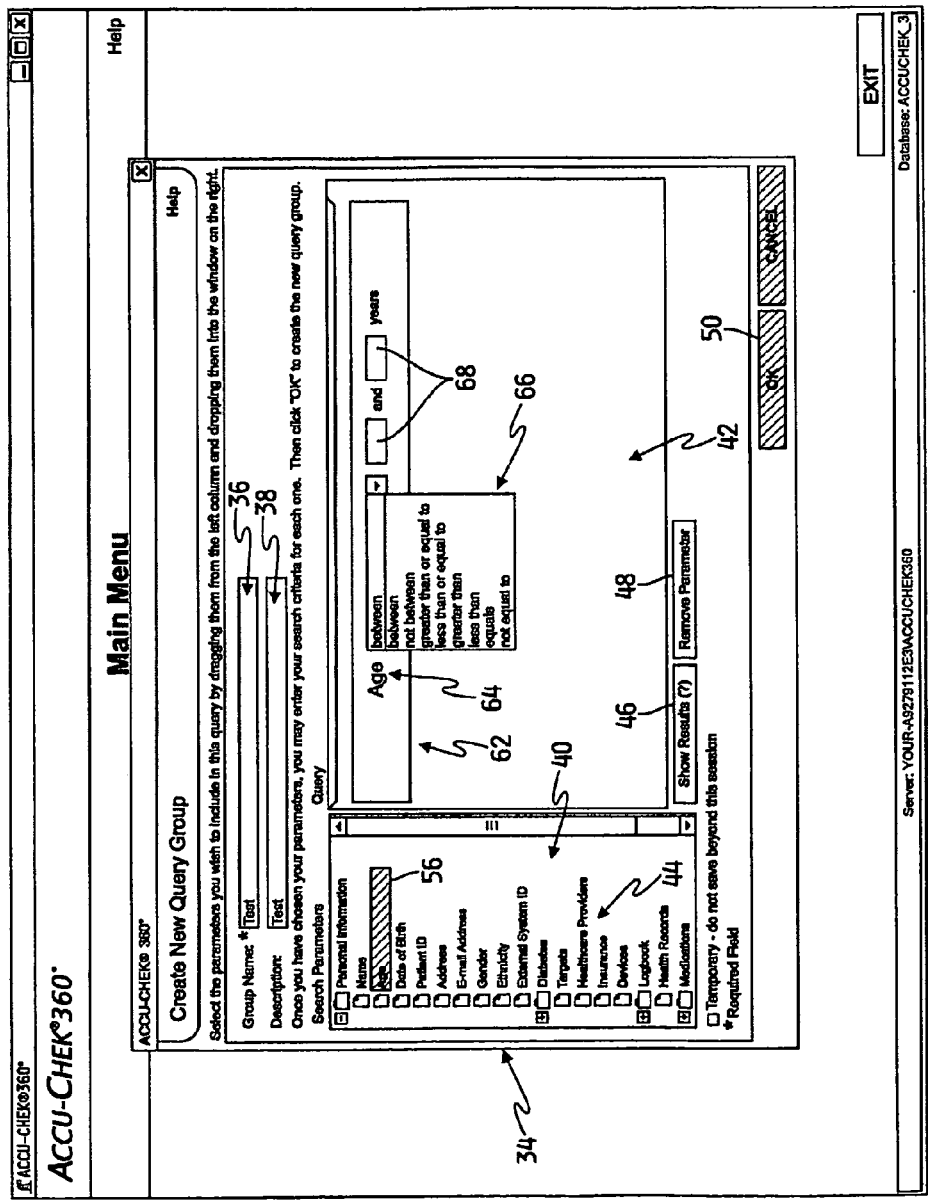
Figure 8:
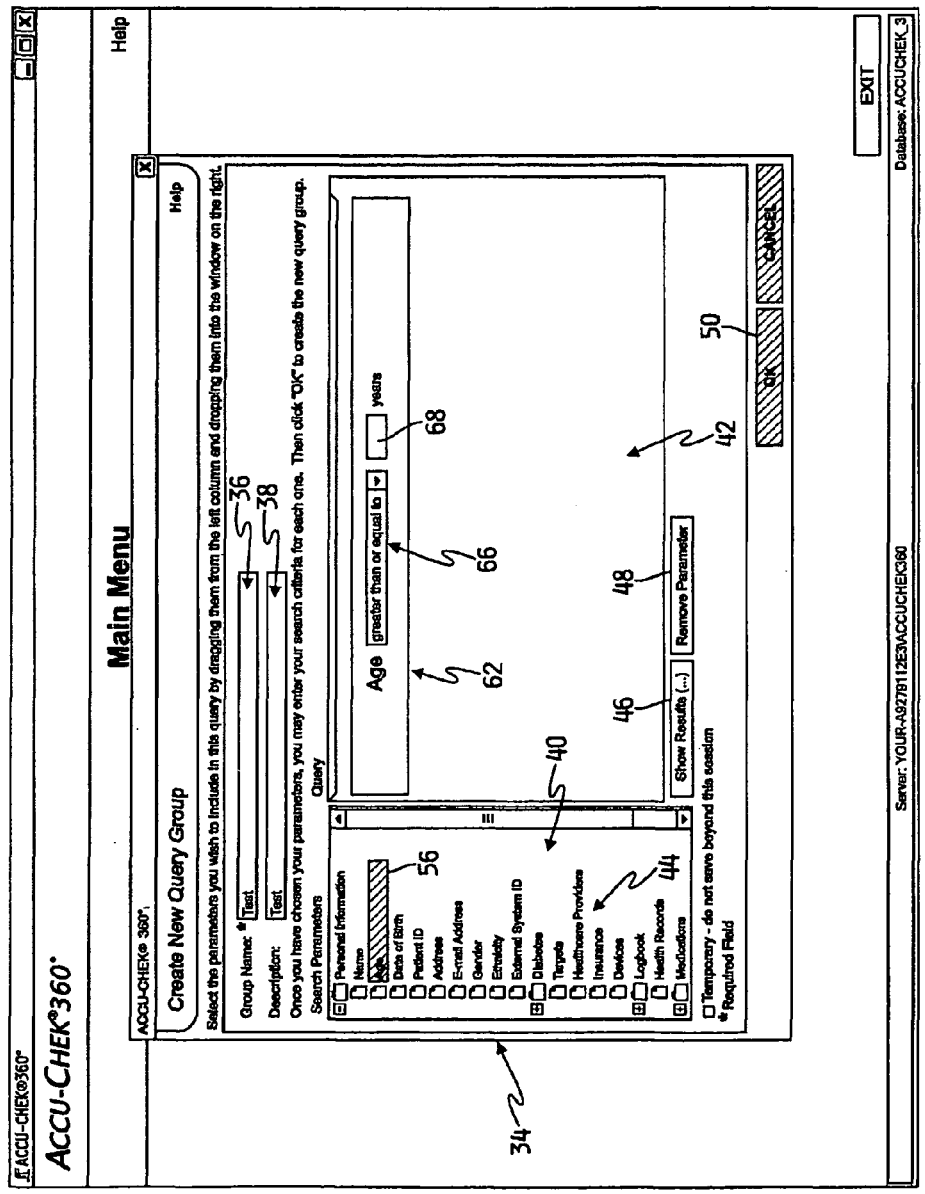

With reference now to FIG. 7, the user may expand the drop down menu 66 in any suitable manner. For example, the user may click the menu 66 in order to expand the menu and allow the user to select different search criteria. In the depicted example, the user may select various criteria for an age search, such as an age range "not between" two numbers, an age "greater than" a number, an age "less than" a number, etc. FIG. 8 provides a screen capture depicting the search box 62 after the search criteria "greater than or equal to" has been selected in the drop down menu 66.

As shown in FIG. 8, the number of information input boxes 68 has been altered in accordance with the search criteria selected, since the selected search criteria only requires one search parameter to be entered. As shown previously, when appropriate, box 62 may include a plurality of boxes 68 in accordance with the criteria selected in menu 68. Once a search criteria has been selected with menu 66 and entered into box 68, the show results icon 46 may be actuated in any conventional manner. For example, the user may move the cursor over the icon 46 and click the icon 46 using a mouse.

Figure 9:
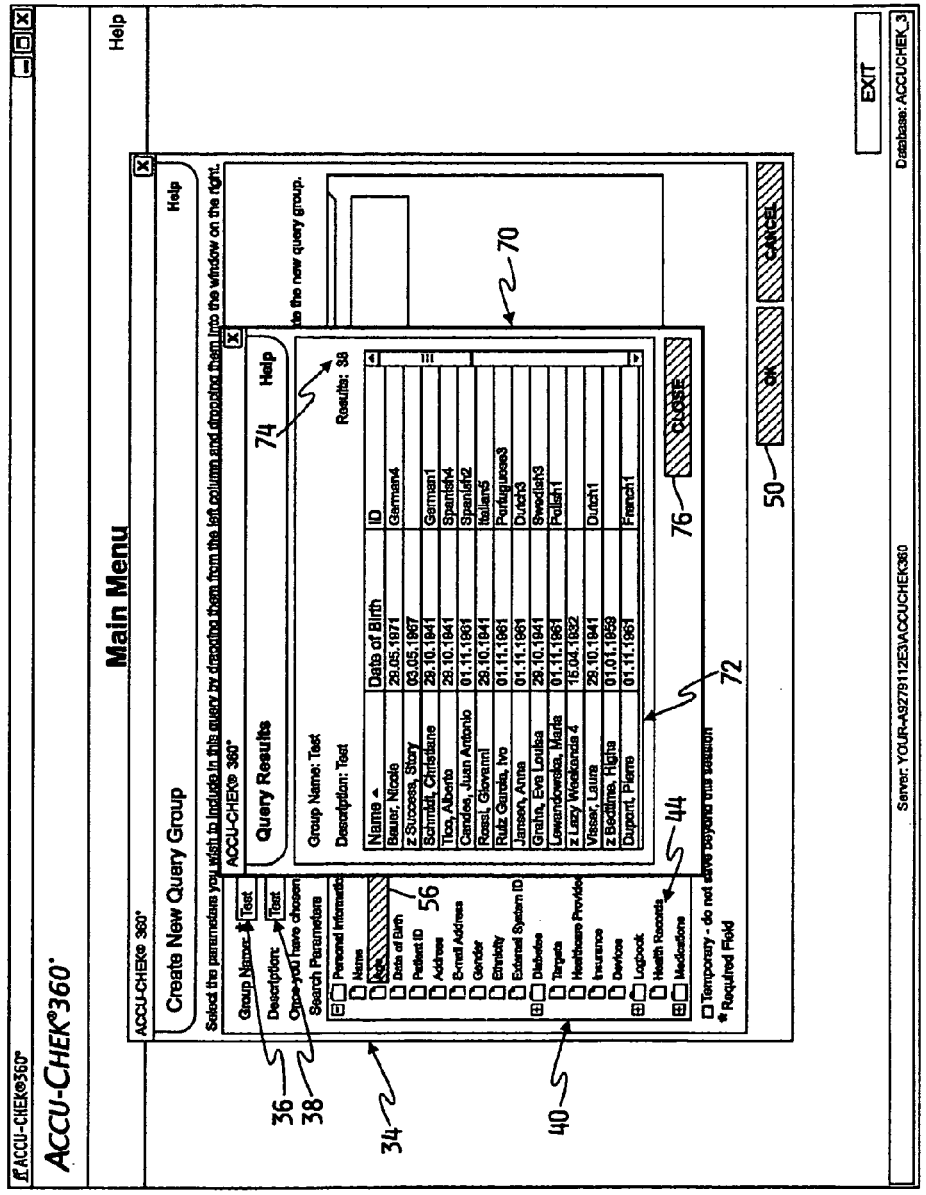

As shown in FIG. 9, upon activating the show results icon 46, the user is shown a results box, generally indicated by numeral 70. The results box 70 includes a list of patients, indicated by numeral 72, meeting the specified search criteria. In addition, box 70 includes a display 74 of the total number of patients meeting the search criteria and included in the list 72. In the current example, 38 patients meet the selected search criteria. Box 70 further includes a close icon 76 capable of closing the box 70 when actuated.

Figure 10:
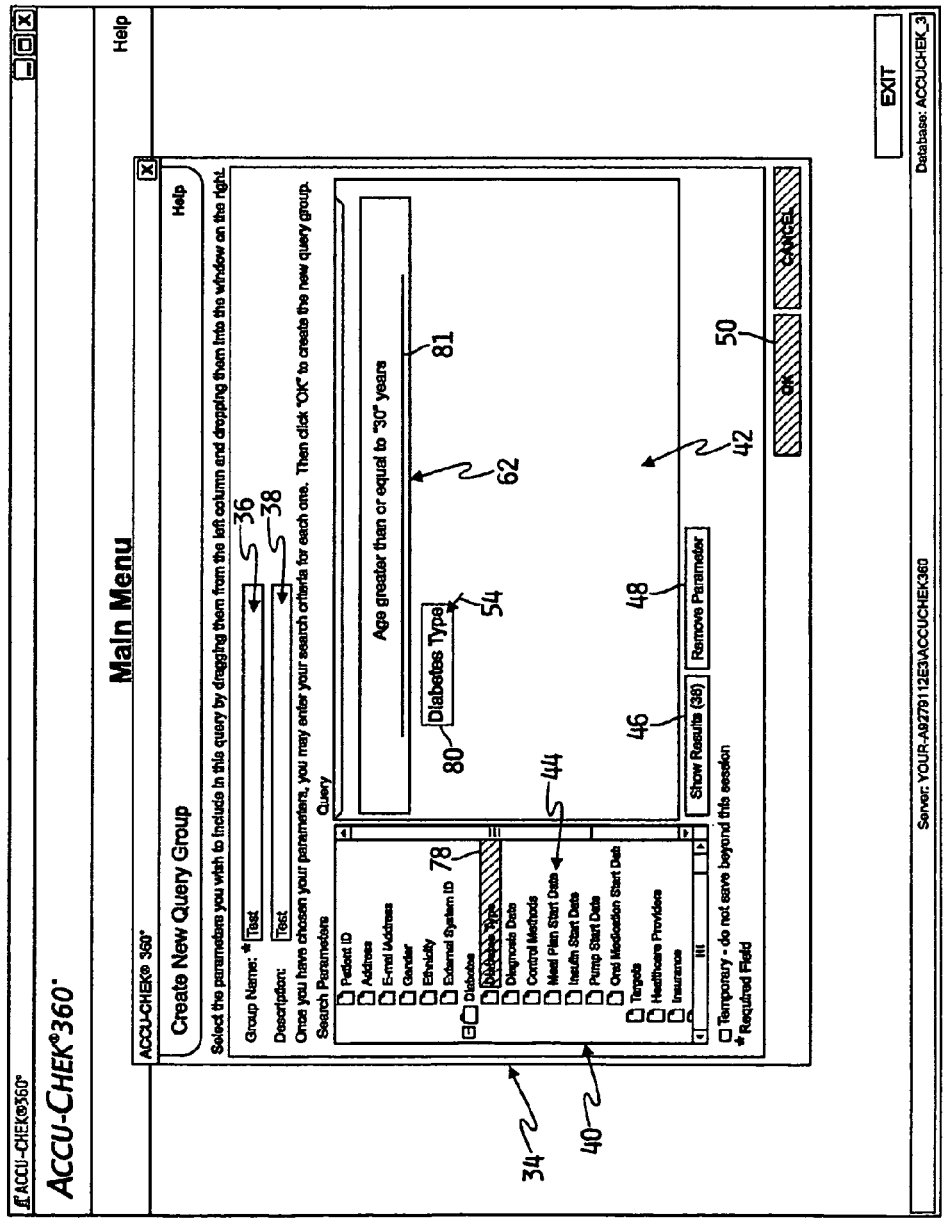

With reference now to FIG. 10, the user may further narrow the search criteria of the group by selecting additional search parameters from the list 44. For example, the user may select diabetes type icon 78 from list 44. In a manner similar to that described above, the user may click and drag the diabetes type icon 78 from the search parameters menu 40 into the query box 42. Again, once the cursor 54 enters the query box 42, an icon 80 displaying "diabetes type" will appear in the query box 42. Similarly, line 81 also appears. It should be noted that the line 81 differs in size from the line 60 shown in FIG. 5, and in embodiments of the invention, line 81 may also differ in color from line 60. It should further be noted that the selection of additional search parameters from list 44 may be accomplished without first selecting the show results icon 46.

Figure 11:
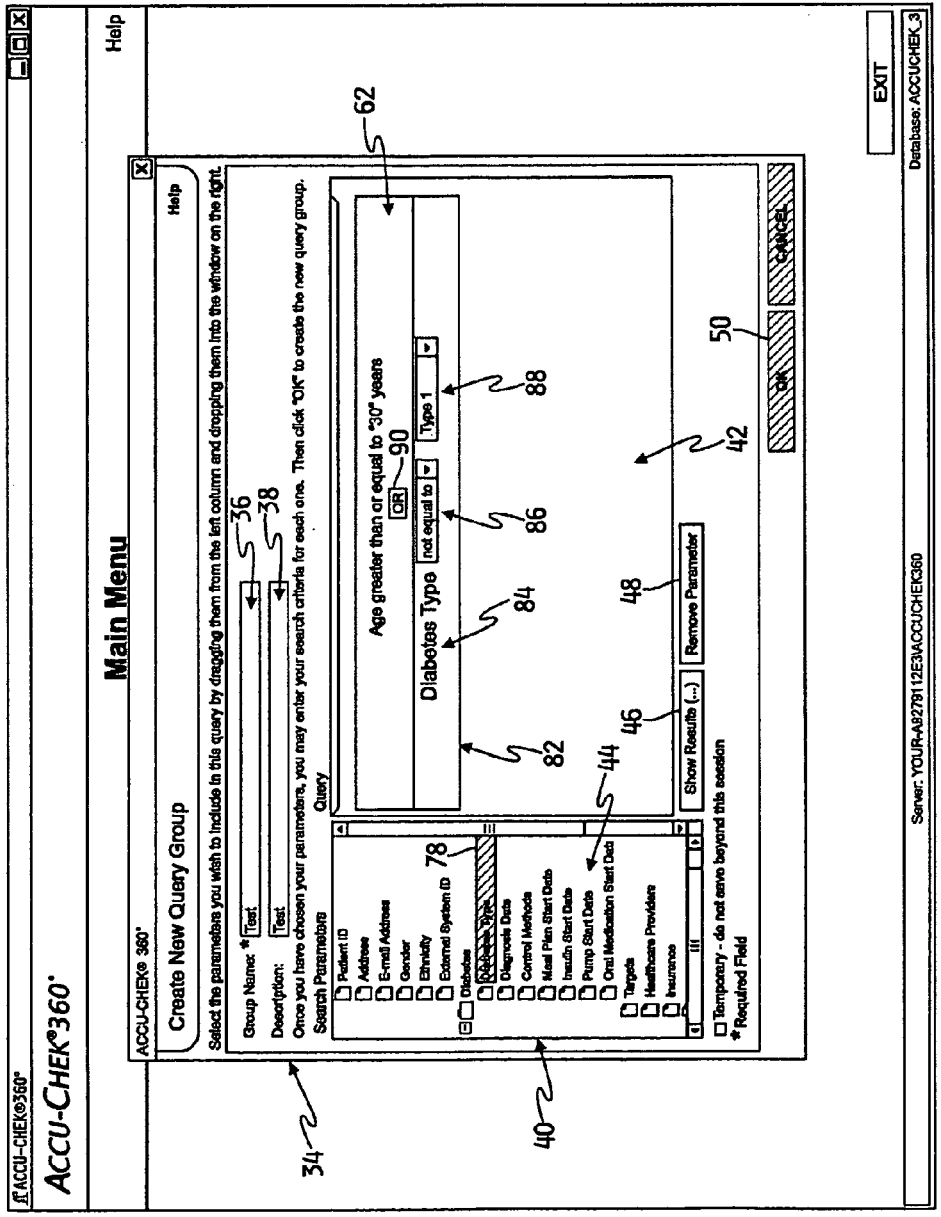

As shown in FIG. 11, once the icon 80 is released, a diabetes type query box 82 appears in the query box 42. Box 82 includes a title 84 indicating the search criteria of box 82 and drop down menus 86, 88. The drop down menus 86, 88 may be utilized to indicate the search criteria for the box 82. In the depicted embodiment, drop down menu 86 provides the operation for the search and menu 88 provides the criteria of the search. For example, drop down menu 86 is set to "not equal to," and drop down menu 88 is set to "Type 1". Accordingly, box 82 is configured to exclude from the search results all patients in the database who have Type 1 diabetes.

With reference still to FIG. 11, query box 42 includes a Boolean operation indicator 90. In the present embodiment, the Boolean indicator 90 is an "OR" operation. Accordingly, the search operation depicted in query box 42 is configured to find all of the patients in the database that satisfy at least one of the search parameters. For example, any patient that is at least 30 years old or does not have Type 1 diabetes will satisfy the search criteria. In a manner similar to that described above, the health care service user can display the patients satisfying the search criteria by actuating the show results icon 46.

Figure 12:
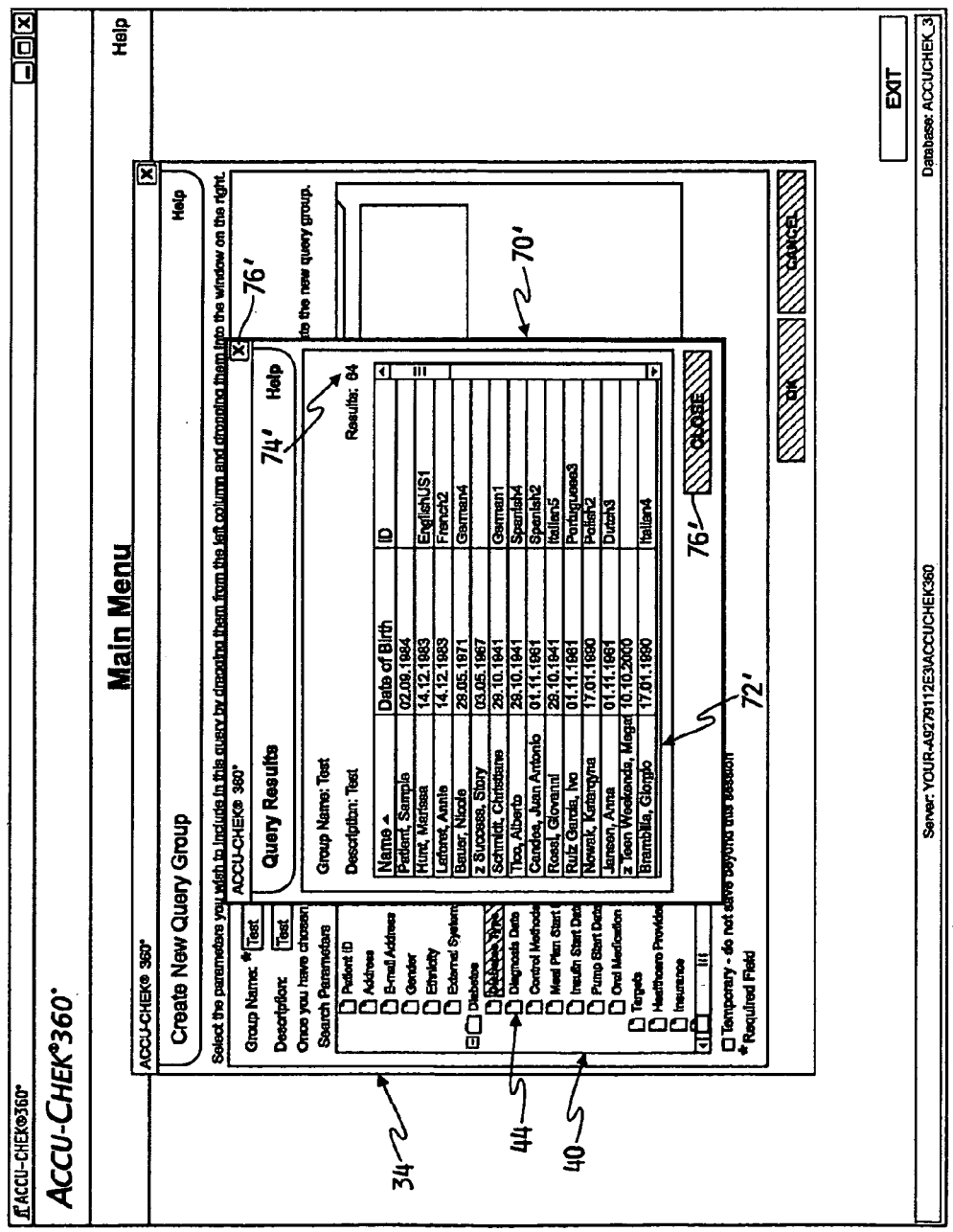

Actuation of the show results icon 46 causes, as shown in FIG. 12, a query results box 70' to be displayed. Box 70' includes a list 72' of patients meeting the search criteria. As shown at 74', the current search found 64 patients satisfying at least one of the two search criteria.

Figure 13:
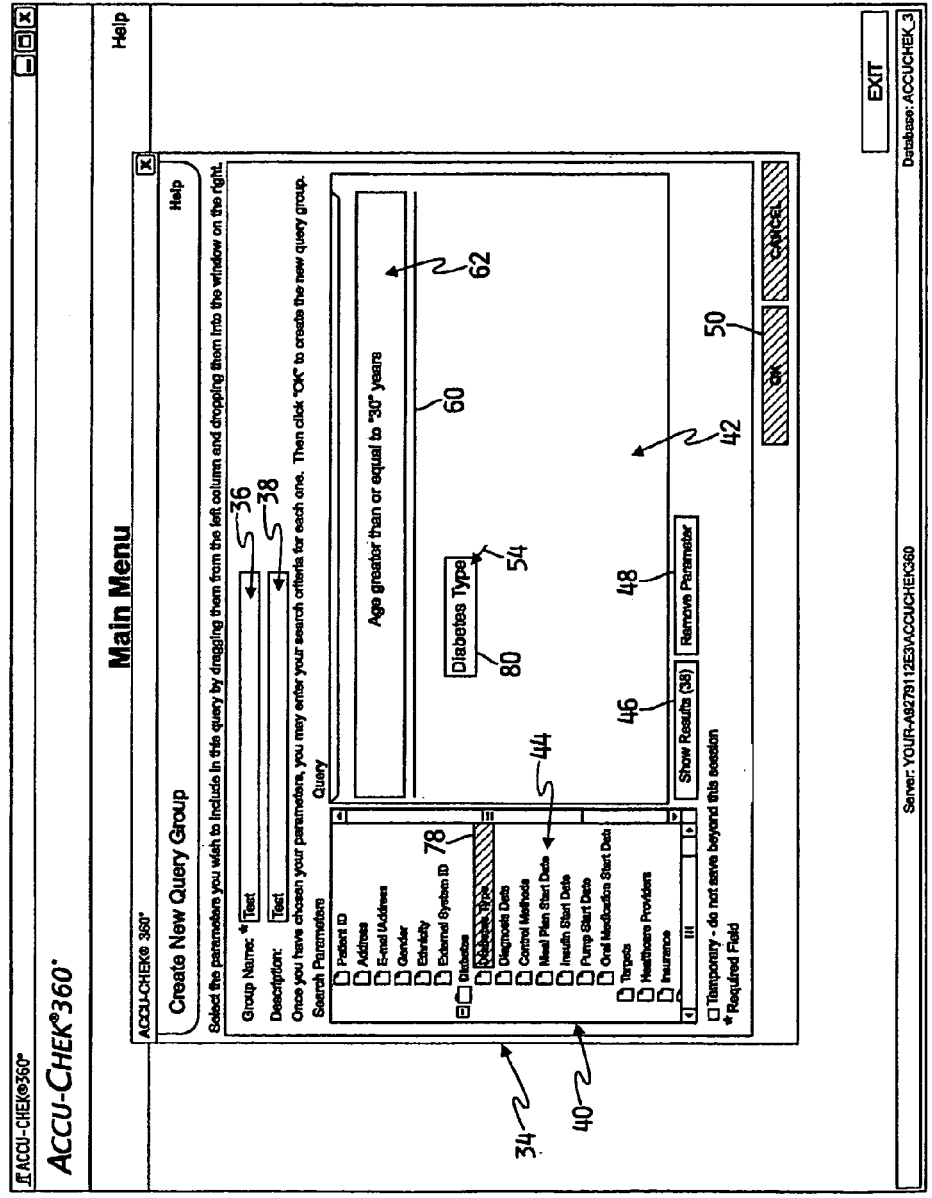

FIG. 13 depicts a screen capture illustrating the manner in which the two example search criteria may be connected using an "AND" Boolean operator. As shown in FIG. 13, in order to connect the search parameters with an "AND" operator, the icon 80 is dragged into the query box 42 at a position further below the position of box 62 depicted in FIG. 10. It should be noted that in FIG. 13, line 60 extends substantially across the entirety of the query box 62, and line 60 is much longer in length than line 81 (FIG. 10). In embodiments, line 60 may also be of a different color than line 81 (FIG. 10). It should be noted that line 81 indicates an "AND" Boolean function will connect the search parameters, and line 60 indicates an "OR" Boolean function will connect the search parameters. Thus, as the user is dragging the icon 80, the user may move icon 80 vertically within box 42 until the line 60, 81 corresponding to the desired Boolean operator appears.

Figure 14:
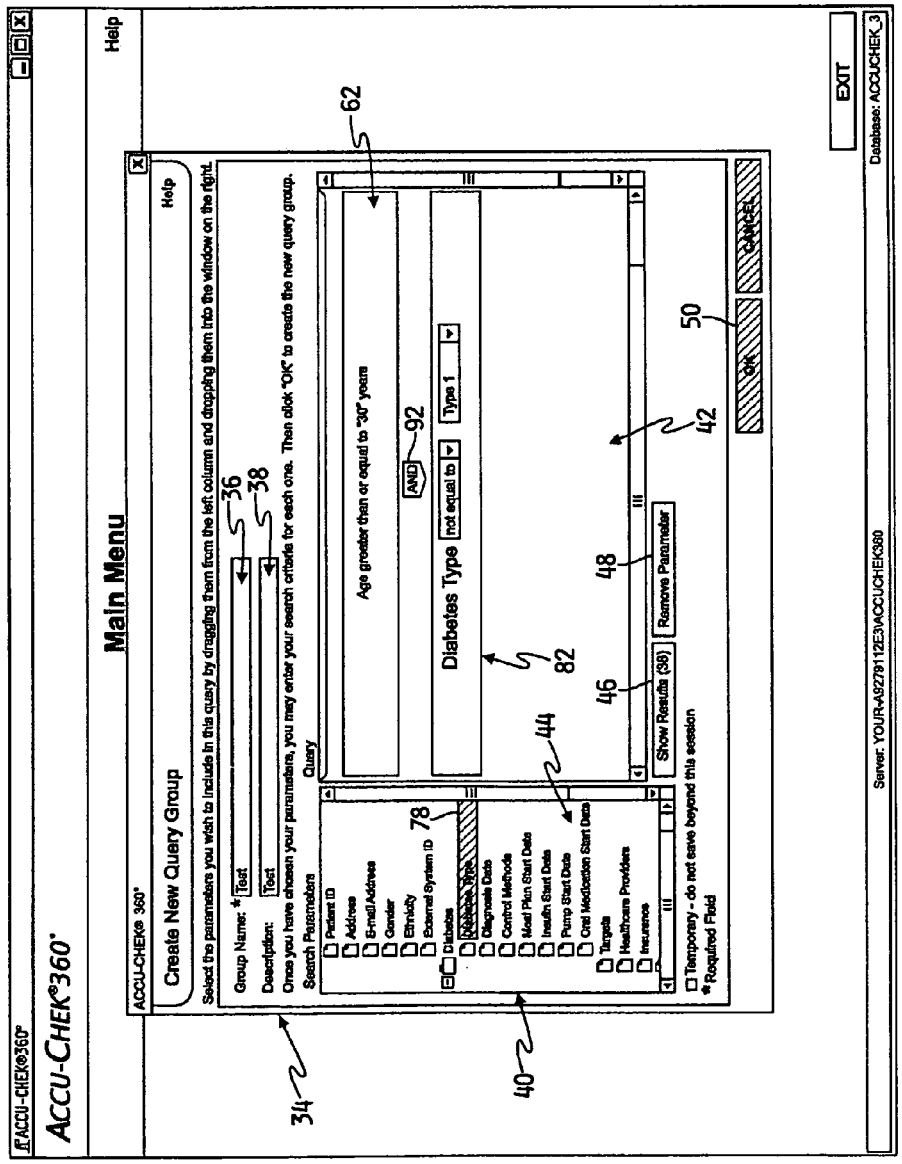

Upon releasing the icon 80, the user is presented with the screen capture depicted in FIG. 14, and query box 42 now includes a Boolean operation AND, indicated by numeral 92. Thus, the search depicted in FIG. 14, will only find patients in the database that are at least 30 years old and do not have Type 1 diabetes. It should be noted that the show results icon 46 now reads "38." In the depicted embodiment of the invention, the show results icon 46 automatically updates in order to inform the user of the number of patients satisfying the search requirements. The user may actuate the show results icon 46 in a suitable manner, as described above, if the user desires to view the patients satisfying the search requirements.

By continuing to drag and drop search parameters 44 from search parameter menu 40 into query box 42, the user may construct a search comprising any number of search parameters. In addition, the search constructed by the user may include any number of Boolean connectors. By positioning the search boxes in a manner similar to that described above, the user may arrange for various Boolean operations connecting the various search parameters. It should be noted that in embodiments of the invention, the software will utilize intelligent constraints in order to prevent a user from conducting a search that will necessarily produce zero results. For example, the software may prevent a user from constructing a search for patients at least 30 years old and also falling between the age of 21 and 25. Since no patient could possibly meet this search criteria, the software may prevent a user from arranging this search.

If the user desires to remove one of the search parameters, the user may click one of the boxes 62, 81 and then actuate the remove a parameter icon 48, in a suitable manner. Furthermore, if the user is satisfied with the search, the user may actuate the OK icon 50 in order to save the group of patients meeting the search criteria.

Figure 15:
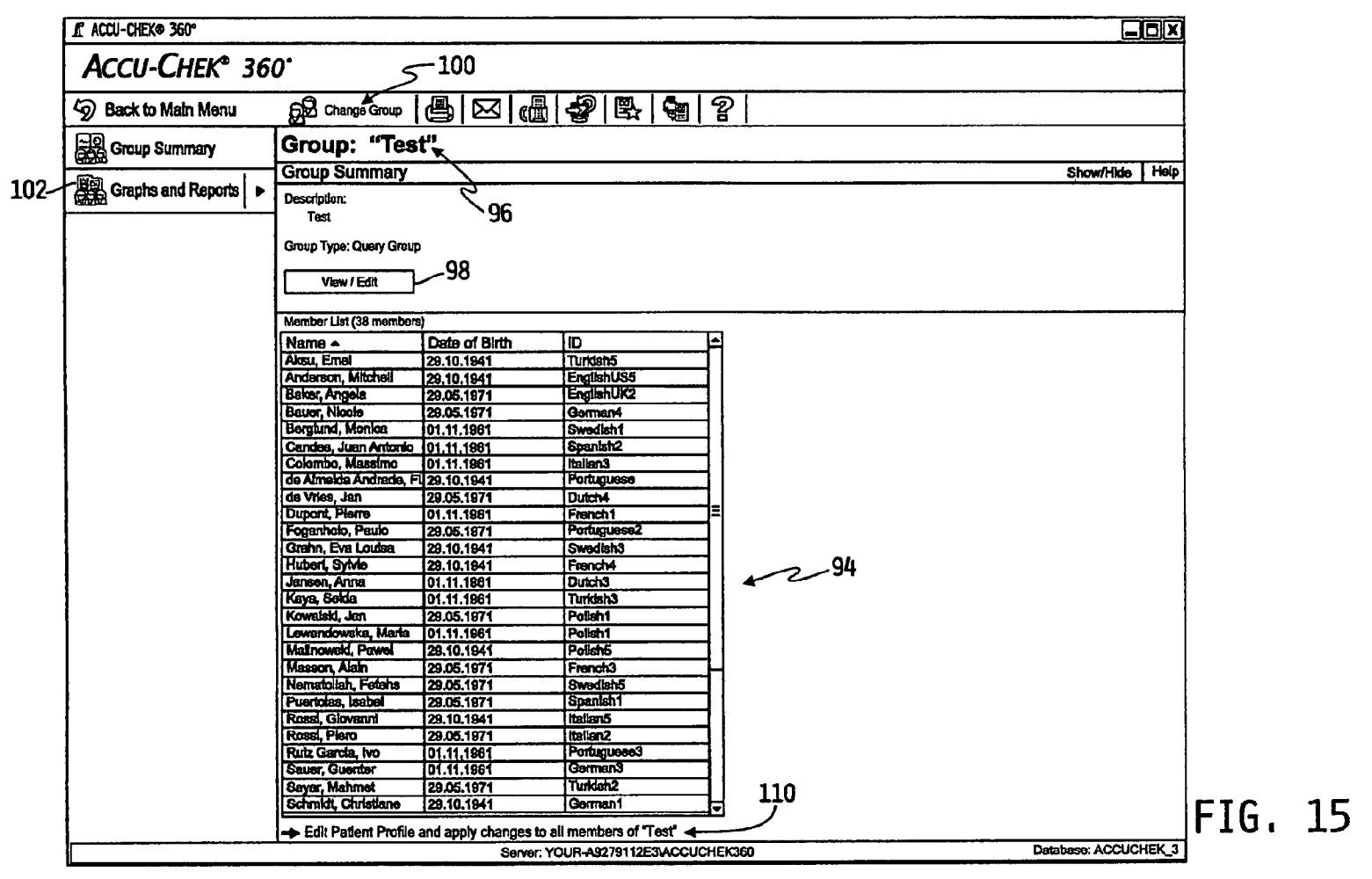

FIG. 15 depicts a screen capture illustrating the patients satisfying the search criteria set forth previously. Numeral 94 generally indicates the list of the patients satisfying the search criteria set forth above. The title of the group is set forth above the list 94 at 96. If the user desires to edit the search criteria, the user may actuate the view/edit icon 98. In addition, by clicking the change group icon 100, the user may change the group in order to select another group of patients in previously saved searches as groups. By actuating the graphs & reports icon 102, the user may display various reports and graphs relating to the health care of the patients comprising the current group. For example, the user can plot blood glucose measurements versus time for the entire group found during the searching. In addition to blood glucose values, exemplary medical information includes A1c values, Albumin values, Albumin excretion values, body mass index values, blood pressure values, carbohydrate values, cholesterol values (total, HDL, LDL, ratio) creatinine values, fructosamine values, HbA1 values, height values, insulin dose values, insulin rate values, total daily insulin values, ketone values, microalbumin values, proteinuria values, heart rate values, temperature values, triglyceride values, and weight values.

Referring still to FIG. 15, icon 110 allows a user to alter or assign certain information related to the entire group. For example, if a user desires to assign all of the patients in a particular group to a specific health care provider, the user actuates icon 110 in a suitable manner, such as by clicking icon 110 with a mouse.

Figure 16:
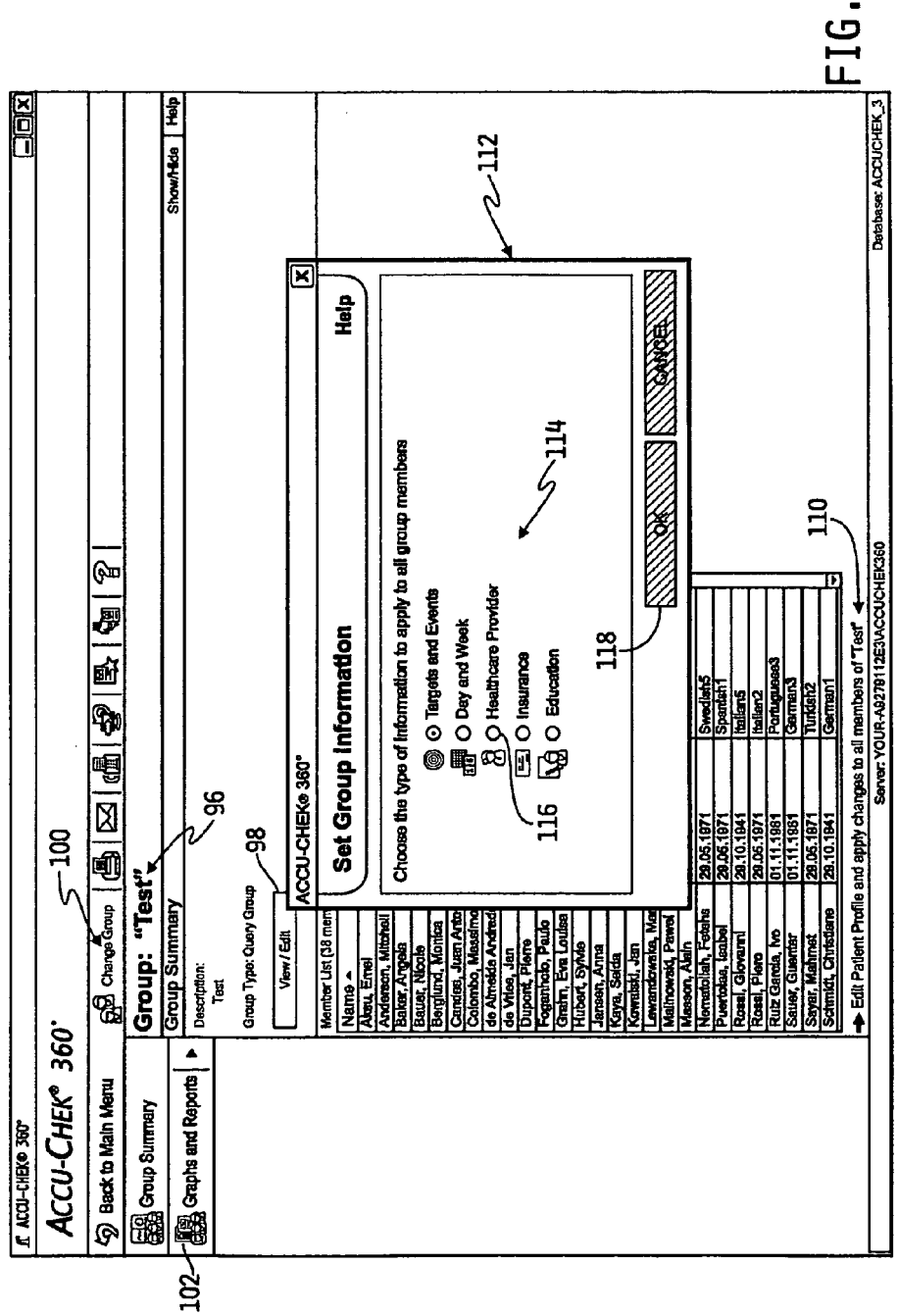

As shown in FIG. 16, once a user actuates icon 110, the software displays a set group interface box 112. Box 112 includes a list of information, generally indicated by numeral 114, that may be applied to all members of the group. In the present example, the user may actuate toggle 116 associated with Healthcare Provider in a suitable manner, such as by clicking toggle 116 with a mouse, in order to assign a Health Care Provider to the entire group. Once the user has clicked toggle 116, the user may then click icon 118 to advance.

Figure 17:
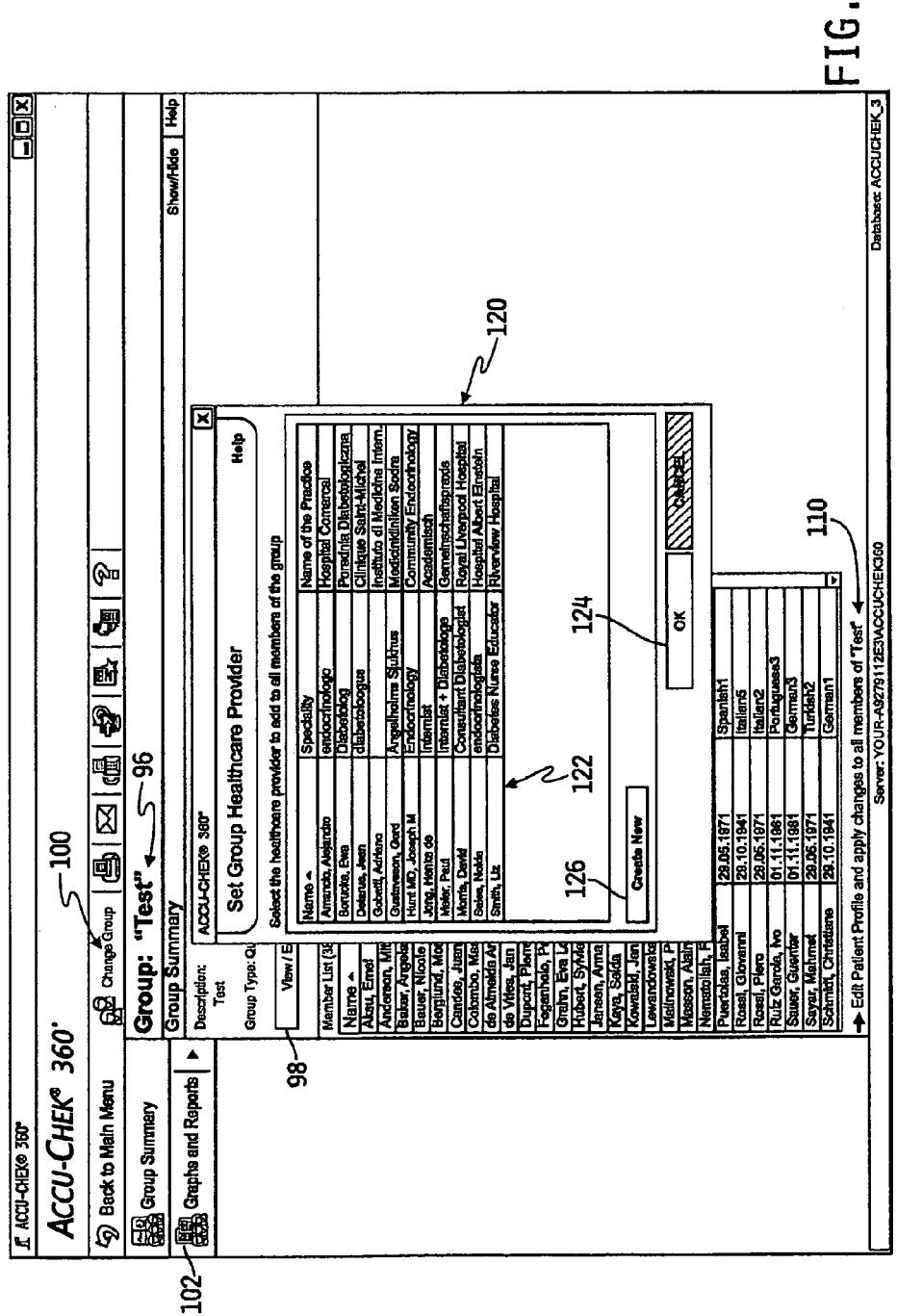

FIG. 17 depicts a screen capture after actuation of icon 118. As shown in FIG. 17, once a user clicks icon 118 after selecting toggle 116, a select group health care provider box 120 is displayed by the software. Box 120 includes a list of health care providers, generally indicated by numeral 122. The user may select the health care provider from the list 122 and click the OK icon 124 in order to assign that health care provider to the entire group of patients. With the Create New icon 126, the user may add a new health care provider to the list 122 by filling out the fields set forth therein in a suitable manner.

It should be noted that this group assignment feature works with the session persistent ad-hoc groups, described above. Accordingly, a user may construct a session persistent ad-hoc group and conduct a group assignment with the listing of patients. The group assignment will continue to be associated with the individual patients, even after the session ends and the temporary group is removed from memory.

Although the software is described herein for operation on a computer (e.g., desktop, laptop or tablet), it should be understood that the principles of the invention may be embodied in software for operation on various devices, including but not limited to personal digital assistants ("PDAs"), infusion pumps, blood glucose meters, cellular phones, or integrated devices including a glucose measurement engine and a PDA or cellular device.

The invention is described herein with reference to healthcare data management software, and more particularly, with reference to diabetes management software, although the invention may be applied, generally, to data management systems in fields unrelated to healthcare management.

While the invention is described herein with reference to medical devices, and more particularly, with reference to diabetes management devices, the invention is applicable to any data obtained from any device.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of querying a database containing a plurality of data records for a population of patients, the data records including personal information relating to the patients and medical information relating to the patients, the method including the steps of:
   displaying a plurality of search criteria on a first portion of a display;
   responding to a user dragging and dropping a first search criteria onto a second portion of the display by displaying the first search criteria in a first position on the second portion of the display;
   responding to the user dragging a second search criteria to a second position in the second portion of the display, the second position being separated from the first position by a first distance in a first direction, by displaying a first indicator representing a first Boolean operational relationship between the first search criteria and the second search criteria;
   responding to the user dragging the second search criteria to a third position in the second portion of the display, the third position being separated from the first position by a second distance in the first direction, by displaying a second indicator representing a second Boolean operational relationship between the first search criteria and the second search criteria, the second Boolean operational relationship being different than the first Boolean operational relationship;
   responding to the user dropping the second search criteria into one of the second position and the third position by identifying data records from the plurality of data records that satisfy a query defined by the first search criteria, the second search criteria, and the Boolean operational relationship between the first search criteria and the second search criteria corresponding to the dropped position of the second search criteria; and
   identifying a group of patients corresponding to the identified data records that satisfy the query.

2. The method of claim 1, further including the step of saving the group of patients to a memory.

3. The method of claim 1, further including the step of displaying a toggle option that permits the user to select between saving the group of patients to memory for future access after ending a querying session and discarding the group of patients after ending the querying session.

4. The method of claim 1, further including the step of displaying a listing of previously identified groups of patients having corresponding data records that satisfy a query.

5. The method of claim 1, wherein the first search criteria includes a first user-selectable parameter and the second search criteria includes a second user-selectable parameter, the method further including the step of preventing the user from setting the second user-selectable parameter to a value that would necessarily yield zero data records satisfying the query.

6. The method of claim 1, further including the step of displaying a set group interface box configured to permit the user to associate information with all patients in the group.

7. The method of claim 1, further including the step of displaying a toggle option that permits the user to select between saving the group of patients to memory for future access after ending a querying session and discarding the group of patients after ending the querying session, the set group interface box permitting the user to associate information with all patients in the group regardless of the user's selection of the toggle option.

8. A method of constructing a search to query a database including a plurality of data records for a population of medical patients, comprising the steps of:
displaying a plurality of individual search criteria in a first portion of a display;
selecting a first individual search criteria from the plurality of search criteria in the first portion of the display and dragging and dropping the first individual search criteria onto one of a first position, a second position and a third position of a second portion of the display;
selecting a second individual search criteria from the plurality of search criteria in the first portion of the display and dragging and dropping the second individual search criteria onto one of a first position, a second position, and a third position of the second portion of the display, wherein a Boolean operational relationship between the first individual search criteria and the second individual search criteria is displayed when the second individual search criteria is dropped onto one of the first portion, the second position, and the third position of the second portion of the display, and further wherein the Boolean operational relationship between the first individual search criteria and the second individual search criteria is determined based upon a distance between the position of the first individual search and the position of the second individual search;
displaying a restriction criteria box including a plurality of restriction options from a list of restriction options including a not between option, a less than option, an equal to option, a greater than option, and a greater than or equal to option with the first individual search criteria when the first individual criteria is dropped into the second portion of the display and with the second individual criteria when the second individual criteria is dropped into the second portion of the display; and
identifying a group of medical patients corresponding to the data records that satisfy the constructed query.

9. The method of claim 8 further including the step of saving the identified group of medical patients corresponding to the data records that satisfy the constructed query to a memory.

10. The method of claim 8, further including the step of displaying a toggle option that permits the user to select between saving the identified group of medical patients corresponding to the data records that satisfy the constructed query to a memory or to discard the identified group of medical patients corresponding to the data records that satisfy the constructed query after ending the query session.

11. The method of claim 8, further including the step of displaying a listing of previously identified groups of medical patients having corresponding data records that satisfy the constructed query.

12. The method of claim 8, wherein the first individual search criteria includes a first user-selectable parameter and the second individual search criteria includes a second user-selectable parameter, the method further including the step of preventing the user from setting the second user-selectable parameter to a value that would necessarily yield zero data records satisfying the constructed query.

13. The method of claim 8, further including the step of displaying a set group interface box configured to permit the user to associate information with all medical patients in the group.

14. The method of claim 13, further including the step of displaying a toggle option that permits the user to select between saving the group of medical patients to memory for future access after ending a querying session and discarding the group of patients after ending the querying session, the set group interface box permitting the user to associate information with all patients in the group regardless of the user's selection of the toggle option.

15. The method of claim 13, wherein the plurality of data records for the population of medical patients is comprised of a plurality of diabetes patient healthcare information.

16. A system for managing healthcare information of diabetes patients, the system comprising:
a database having a plurality of diabetes patient healthcare information, wherein the diabetes patient healthcare information includes patient personal information including a plurality of informational fields for a first name, a middle name, a last name, a suffix, a date of birth, and a gender and patient medical information including a plurality of informational fields from the group of diabetes type, blood glucose readings over time, Albumin values, Albumin excretion values, body mass index, blood pressure, carbohydrate value, cholesterol values, creatine values, fructosamine values, high values, insulin dose values, ketone values, microalbumin values, proteinuria values, heart rate values, temperature values, triglyceride values, weight values, and insulin type utilized by the diabetes patient;
a machine-executable program capable of identifying diabetes patient healthcare information associated with the database by querying the plurality of informational fields associated with the patient personal information and the patient medical information, the machine-executable program having a main menu user function having a plurality of patient management options including a patient management selection and a population management selection, wherein the patient management selection includes a display having a first portion with a plurality of search criteria options including diabetes patient informational fields associated with patient personal information and patient medical information, a second portion adjacent to the first portion and having at least a first position, a second position, and a third position, and a user interface box having a results display option, and further wherein the search criteria options are capable of being placed in one of the first position, the second position, and the third position of the second portion of the display;
wherein the placement of two or more of the search criteria options in one of the first position, the second position, and the third position defines a Boolean operational connection between the two or more search criteria options placed in the second portion of the display and when the search criteria options are placed in one of the first position, the second position, and the third position, a restriction criteria box including at least two restriction options from the group of a not between option, a less than option, an equal to option, a greater than option, and a greater than or equal to option, associates with the search criteria option placed in the second portion of the display, and further wherein when the results display option of the user interface box is selected the diabetes patients contained in the database satisfying the search criteria options, the Boolean operational connections, and the restriction criteria boxes are displayed and the user is further presented with a diabetes patient information view option and a diabetes patient information edit option wherein the diabetes patient edit information includes a group assignment feature and a group healthcare provider feature; and a computing device capable of operatively communicating with the database having a plurality of diabetes patient health care information, executing the machine-executable program, and receiving diabetes patient healthcare information input, wherein the computing device is further capable of incorporating the received diabetes patient healthcare information input and incorporating it into the database or a function of the machine-executable program.

17. The system of claim 16, further including an option to save the displayed diabetes patients contained in the database satisfying the search criteria options, the Boolean operational connections and restriction criteria boxes as a group.

18. The system of claim 17, wherein the machine-executable program is further capable of identifying a listing of previously saved groups of diabetes patients having healthcare information that satisfy later queries of the database.

19. The system of claim 16, further including a toggle option that permits the user to select between saving the group of diabetes patients to memory for future access and discarding the group of diabetes patients.

20. The system of claim 16, wherein the plurality of search criteria options includes a first search criteria having a first user-selectable parameter and a second search criteria having a second user-selectable parameter, the second user-selectable parameter not capable of being set to a value that would necessarily yield zero data records satisfying the query.

* * * * *